Patented July 14, 1925.

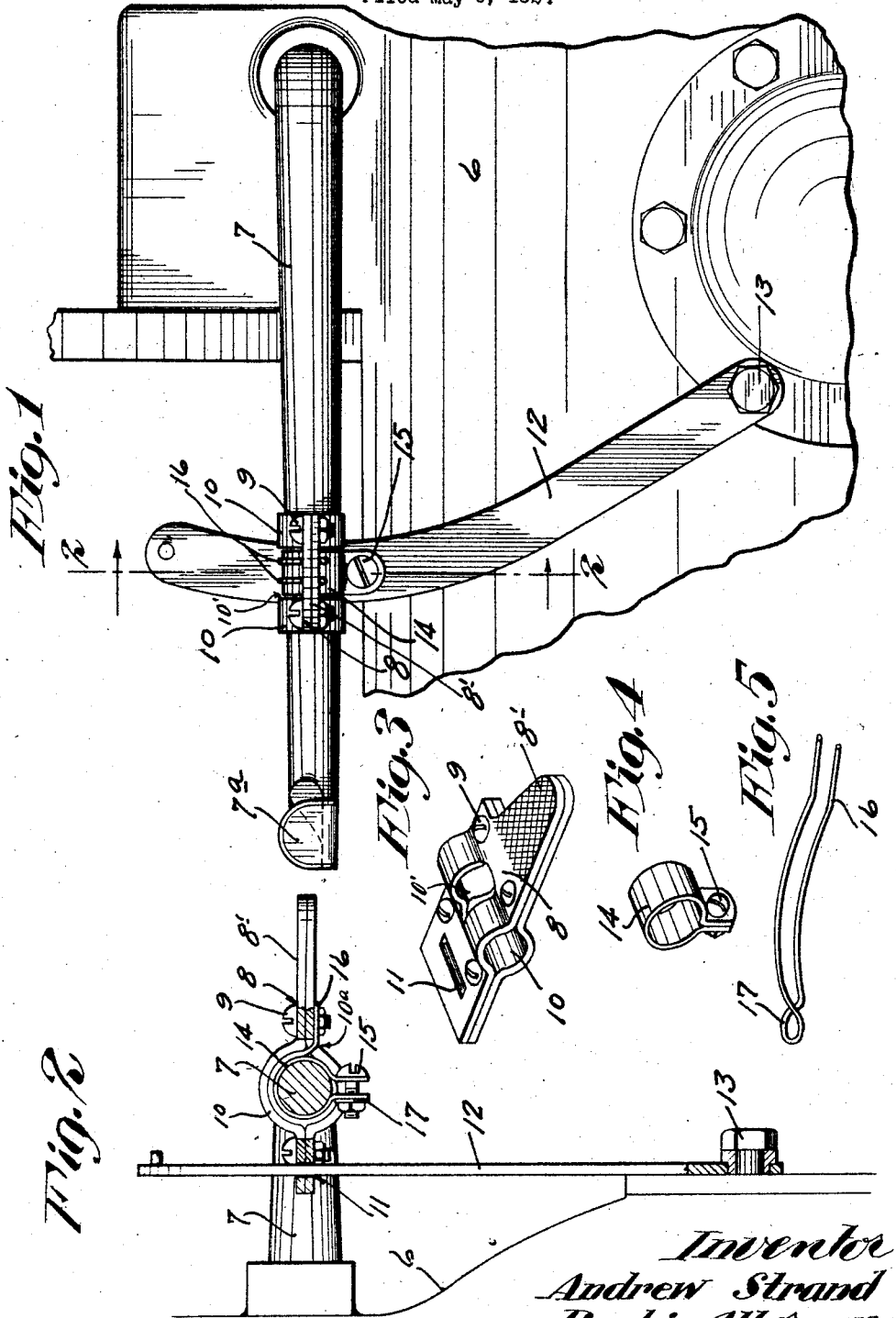

1,545,531

UNITED STATES PATENT OFFICE.

ANDREW STRAND, OF MINNEAPOLIS, MINNESOTA, ASSIGNOR TO NORTHWEST MANUFACTURING CO., A CORPORATION OF MINNESOTA.

PEDAL LATCH.

Application filed May 8, 1924. Serial No. 711,927.

*To all whom it may concern:*

Be it known that I, ANDREW STRAND, a citizen of the United States, residing at Minneapolis, in the county of Hennepin and State of Minnesota, have invented certain new and useful Improvements in Pedal Latches; and I do hereby declare the following to be a full, clear, and exact description of the invention, such as will enable others skilled in the art to which it appertains to make and use the same.

My invention provides extremely simple and highly efficient means for latching or securing a pedal of a motor-propelled vehicle or the like in a depressed position, and, generally stated, the invention consists of the novel devices and combinations of devices hereinafter described and defined in the claims.

This pedal latch is capable of different applications but it finds its most important use when applied to the brake pedal of a motor-propelled vehicle such as a Fordson tractor, and in a further description thereof will be described in this preferred application. When applied as just indicated, the brake pedal may be depressed to set the brakes under any desired friction and the brake pedal secured for such brake-setting action, but, by very simple manipulations of the foot used to depress the brake pedal, the latch may be released so that the pedal will automatically move to or toward brake-releasing position.

The commercial form of the device is illustrated in the accompanying drawings wherein like characters indicate like parts throughout the several views.

Referring to the drawings:

Fig. 1 is a side elevation showing a part of the motor and transmission casing of a Fordson tractor;

Fig. 2 is a section on the line 2—2 of Fig. 1;

Fig. 3 is a perspective showing a gripper-acting latch dog removed from working position;

Fig. 4 is a perspective showing a spring anchor removed from the pedal; and

Fig. 5 is a perspective showing a dog-actuating spring removed from working position.

The engine and clutch casing are indicated by the numeral 6 and the brake pedal, which is pivotally mounted thereon and operates brake mechanism in the customary well known manner, is indicated by the numeral 7.

The pedal 7, at its free end, is provided with the customary laterally projecting foot piece 7ª. The arm of the pedal 7, of the customary construction, is round in cross section. Mounted on the intermediate portion of the arm of the pedal 7 is a gripper-acting latch dog shown as made up of two stamped metal plates 8 rigidly connected face to face by screws 9 and at their intermediate portions reversely bulged to form a bearing sleeve 10. When the plates of the dog 8 are separated, its sleeve portion 10 may be readily applied around the intermediate portion of the arm of brake pedal 7, as shown in Figs. 1 and 2. One end, dog 8 projects to afford a toe piece, the upper surface of which is preferably barbed or roughened as indicated at 8'. But at its other end said dog is formed with a rectangular perforation 11. A latch bar 12 is extended through the angular perforation 11 and its lower end is shown as anchored to the casing 6 at 13. The upper portion of the latch bar 12 is curved on the arc of a circle, the center of which is at the axis of the pivoted support of brake lever 7. The sleeve-forming portions 10 of this latch dog are intermediately cut away at 10' to afford a seat for a spring-anchoring ring 14 that embraces the arm of brake pedal 7. Anchoring ring 14 is a split ring having projecting ends connected by a nut-equipped bolt 15 which, when tightened, rigidly anchors said ring to the arm of the brake pedal.

The numeral 16 indicates a spring, as shown of the sear spring type, made of a single piece of spring steel wire bent to form parallel prongs and an eye 17. Spring 16 is extended through the passages 10ª, bears upon the top of the anchoring ring 14, and bolt 15 is passed through the eye 17 thereof. Thus, spring 16 is anchored to the anchoring ring 14 and the free ends of its prongs are projected under the toe piece end of the latch dog. This spring 16, when thus applied, exerts a force which tends to rock the latch dog in a counter clockwise direction in respect to Fig. 2. This will cause the opposing surfaces of the perforation 11 to frictionally grip and tightly bite upon the latch bar, and thereby hold the brake pedal or lever 7 in any depressed position in which it may be set at a time when the latch dog is released. Of course, the above gripping or biting action between the latch dog and the latch bar will be sufficient to prevent accidental slipping, for the greater the force tending to move the pedal 7 upward, the greater will be the said biting action.

To release the latch dog it is only necessary to slightly depress the toe end 8'. The operator will naturally keep his foot on the foot piece 7ª of pedal 7 with his toe overlying particularly the toe end 8' of the latch dog so that by a very slight depression of the toe of the foot, the latch dog can be released and the brake pedal permitted to move upward or to brake-releasing position under the action of the customary releasing spring, not shown.

Thus, by these manipulations which are very easy to perform, the brake pedal may be depressed temporarily, with the brakes under any desired friction, and very quickly and easily released. Obviously, the device described may be very cheaply made and quickly applied to the brake pedal or lever of a Fordson tractor or the like.

In actual practice the device has been found very highly efficient.

What I claim is:

1. The combination with a pedal of the character described and having a radial arm adapted to be depressed by foot pressure to operate the pedal, of an anchored latch bar extending along the line of movement of said arm, and a latch dog mounted on said arm for rocking movement transversely thereof and for biting action on said latch bar to hold the arm against upward movement, said latch dog being arranged to be released by pressure from the foot used to depress the radial arm and operate the pedal.

2. The combination with a pedal of the character described and having a radial arm, of an anchored latch bar extended along the line of movement of said pedal, and a frictional latch dog swivelled on the arm of said pedal, having a biting action on said latch bar to hold said pedal against upward movements but itself arranged to be forced into a releasing position by pressure from the foot used to operate said pedal.

3. The combination with a depressible pedal of the character described and having a radial arm, of an anchored latch bar, a latch dog swivelled on the arm of said pedal, having a passage through which said latch bar is passed, a spring acting on said latch dog to cause the same to normally grip said latch bar and hold said pedal depressed, the latch dog being releasable by pressure.

4. The combination with a depressible pedal of the character described and having a radial arm, of an anchored latch bar, a latch dog pivotally mounted on the arm of said pedal, having a passage through which said latch bar is passed, a spring acting on said latch dog to cause the same to normally grip said latch bar and hold said pedal depressed, said pedal having a foot piece and said dog having a projecting end so positioned in respect to said foot piece that said dog may be released by pressure of the toe of the foot placed on the foot piece of said pedal.

5. The structure defined in claim 4 in which said dog is intermediately pivoted on said lever and projects on opposite sides thereof, the one end gripping said latch bar and the other exposed for engagement with the foot.

6. The structure defined in claim 4 in which said latch dog is made up of two plates rigidly connected and provided with intermediate sleeve-forming depressions pivotally engaging said pedal, and a spring anchored to said pedal and operative on said latch dog by a force causing the same normally to grip said latch bar and hold said pedal depressed.

7. The structure defined in claim 4 in which said latch dog is made up of two plates provided with intermediate sleeve-forming depressions pivotally engaging said pedal, the said sleeve-forming portions being bifurcated, an anchoring ring clamped to said pedal in the opening between the bifurcated sleeve-forming portions, and a spring anchored to said anchoring ring and operating on said dog with a force tending normally to cause the same to grip said latch bar and hold said pedal depressed.

In testimony whereof I affix my signature.

ANDREW STRAND.